(12) United States Patent
Ng

(10) Patent No.: US 7,875,086 B2
(45) Date of Patent: Jan. 25, 2011

(54) SEPARATION OF FULLERENE $C_{60}$ AND $C_{70}$ USING CRYSTALLIZATION

(75) Inventor: Ka Ming Ng, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 616 days.

(21) Appl. No.: 11/652,475

(22) Filed: Jan. 12, 2007

(65) Prior Publication Data

US 2007/0274894 A1    Nov. 29, 2007

Related U.S. Application Data

(60) Provisional application No. 60/758,208, filed on Jan. 12, 2006.

(51) Int. Cl.
*B01D 9/00* (2006.01)
(52) U.S. Cl. ........................ 23/295 R; 23/296
(58) Field of Classification Search ............... 23/295 R, 23/296
See application file for complete search history.

(56) References Cited

U.S. PATENT DOCUMENTS

| 5,188,918 A | 2/1993 | Ziolo |
| 5,711,927 A | 1/1998 | Atwood et al. |

FOREIGN PATENT DOCUMENTS

JP    2004-244245    9/2004

OTHER PUBLICATIONS

Atwood et al., "Purification of $C_{60}$ and $C_{70}$ by Selective Complexation with Calixarenes." *Nature*, v.368 pp. 229-231 (1994).
Kroto et al., "$C_{60}$: Buckminsterfullerene." *Nature*, v.318 pp. 162-163 (1985).
Krätschmer et al., "Solid $C_{60}$: A New Form of Carbon." *Nature*, v.347 pp. 354-358 (1990).
Taylor et al., "Isolation, Separation and Characterisation of the Fullerenes $C_{60}$ and $C_{70}$: The Third Form of Carbon." *J. Chem. Soc., Chem. Commun.*, pp. 1423-1425 (1992).
Vassalio et al., "Improved Separation of Fullerene-60 and -70." *J. Chem. Soc., Chem. Commun.*, pp. 60-61 (1992).
Scrivens et al., "Purification of Gram Quantities of $C_{60}$: A New Inexpensive and Facile Method." *J. Am. Chem. Soc.*, v.114 pp. 7917-7919 (1992).
Coustel et al., "Purification of $C_{60}$ by a Simple Crystallization Procedure." *J. Chem. Soc., Chem. Commun.*, pp. 1402-1403 (1992).
Rudy M. Baum, "Chemists Increasingly Adept at Modifying, Manipulating Fullerenes." *Chemical and Engineering News*, pp. 31-33 (Sep. 20, 1993).
Zhou et al., "Seperation of $C_{60}$ and $C_{70}$ Fullerenes in Gram Quantities by Fractional Crystallization." *Carbon*, v.32(5) pp. 935-937 (1994).

*Primary Examiner*—Edward M Johnson
(74) *Attorney, Agent, or Firm*—The Nath Law Group; Jerald L. Meyer; Tanya E. Harkins

(57) ABSTRACT

The present invention is a method for simultaneously separating two highly pure fullerenes from a mixture of fullerenes via crystallization, by (i) adjusting the amount of solvent in the mixture fed to a first crystallizer to obtain a phase equilibrium behavior so a first fullerene component of the two fullerenes, in the form of pure crystal, solid solution crystal, or solvate crystal is obtained; (ii) adjusting the amount of solvent in another mixture fed to a second crystallizer, operating at a temperature different from the first crystallizer, to obtain a phase equilibrium behavior so a second fullerene component of the two fullerenes, in the form of pure crystal, solid solution crystal, or solvate crystal is obtained; and additionally (iii) purifying the solid solution or the solvate into highly pure fullerene, when the solid product from the crystallizers is in the form of solid solution or solvate.

22 Claims, 13 Drawing Sheets

SEPARATION OF FULLERENE $C_{60}$ AND $C_{70}$ USING CRYSTALLIZATION

CROSS-REFERENCE TO RELATED APPLICATIONS

This application claims the benefit of U.S. Provisional Application Ser. No. 60/758,208, filed Jan. 12, 2006 in the name of NG, Ka Ming and entitled "Separation of Fullerene $C_{60}$ and $C_{70}$ Using Crystallization", said provisional application being hereby incorporated by reference as if fully set forth herein.

FIELD OF THE INVENTION

The present invention relates to a method for simultaneously separating two highly pure fullerenes via crystallization. In particular, the present invention relates to a method for simultaneously separating two highly pure fullerenes from a mixture of fullerenes that mainly contains the two fullerenes, wherein the phase equilibrium behaviors of certain process streams are manipulated such that pure fullerenes, solid solutions or solvates are crystallized out.

BACKGROUND OF THE INVENTION

Fullerenes are one of the four types of naturally occurring forms of carbon, besides diamond, graphite, ceraphite and diamondoids. Fullerenes are composed entirely of carbon, and the molecules can take the form of a hollow sphere or ellipsoid.

One of the most common fullerenes is $C_{60}$, also referred to as Buckminsterfullerene, the structure of which is a network of hexagons and pentagons resembling a round soccer ball (Kroto, H. W. et al., "$C_{60}$: Buckminsterfullerene", 318 Nature, pp. 162-163, November 1985). Other higher fullerenes such as $C_{70}$, $C_{76}$, $C_{84}$, and so on have also been discovered.

Since the discovery of $C_{60}$, various potential applications of fullerenes have been identified, including using fullerenes as lubricants, controlled-release agent in drugs, and a component in superconductors. Other applications of fullerenes include optical devices, carbides, chemical sensors, gas separation devices, thermal insulation, diamonds, diamond thin films, hydrogen storage, and even a pigment for toner compositions (see, U.S. Pat. No. 5,188,918). However, the difficulties in the preparation, isolation and purification of fullerenes have greatly hindered commercial exploitation thereof.

A common method for the preparation of fullerenes is by burning a hydrocarbon compound. For example, in the Huffman-Krätschmer carbon arc method (Krätschmer et al, Nature, 347, 354 (1990)), one of the more common methods for generating fullerenes today, fullerenes are prepared by heating pure carbon in the form of graphite to its plasma temperature by using graphite electrodes in arc in an inert atmosphere, which creates soot from which a fullerene mixture may be separated. The resulting crude fullerene mixture consists of 65-85% of $C_{60}$ and 10-30% of $C_{70}$, with higher fullerenes making up the balance of the material. Such higher fullerenes from the crude fullerene mixture include all the fullerenes higher than $C_{70}$, generally $C_{72}$-$C_{200}$ as the soluble fullerenes.

However, due to the highly similar structure, solubility, and reactivity of the fullerenes in the mixture, with the various fullerenes only being differentiated in their molecular weight, it has been difficult to separate the discrete fullerene components from the crude fullerene mixture. On the other hand, there is high economic incentive for such separation, since highly pure fullerenes can sell at more than fifty times the price of the mixture of fullerenes.

While solvent extraction followed by adsorption of pure fullerenes, could lead to isolation of some fullerenes in highly pure form, the separation of highly pure fullerenes from a fullerene mixture has remained a difficult challenge. For example, a common method of liquid chromatography using neutral alumina as column packing (Taylor et al., J. Chem. Soc., Chem. Commun. 1423 (1992)); using graphite (Vassalo et al., J. Chem. Soc., Chem. Commun. 60 (1992)); or using activated charcoal (Scrivens et al., J. Am. Chem. Soc. 114, 7919 (1992)) has been reported, but the reported methods did not provide an efficient separation/purification of fullerenes on a large scale due to inherent losses of fullerenes attributable to chromatographic techniques. In particular, inherent losses resulted from irreversible adsorption of the fullerenes onto the adsorption medium.

To avoid the drawbacks of the chromatographic method, crystallization/recrystallization methods wherein highly pure solids are formed from a solution, have been reported. Since fullerenes are generally solid products at room temperature, it would be advantageous to use crystallization to obtain solids consisting of highly pure fullerenes from a solution containing a mixture of fullerenes.

For instance, Coustel et al. have reported in the J. Chem. Soc., Chem. Commun. 1402 (1992) that $C_{60}$ crystallizes during toluene soxhlet extraction of fullerenes from soot. About 40 wt % of the fullerenes in the soot could be obtained as mostly pure $C_{60}$ with trace impurities of $C_{70}$. The trace impurities of $C_{70}$ can be removed by a second recrystallization from a toluene soxhlet. By this method, 99.99% pure $C_{60}$ can be obtained. However, while high purity $C_{60}$ could be obtained, the process is very inefficient.

Prakash et al. have reported in the Chemical and Engineering News, (Sep. 20, 1993, p. 32) that $C_{60}$ can be purified from $C_{70}$ by precipitation of an $AlCl_3$-$C_{60}$ complex from $CS_2$ $C_{60}$ of greater than 99.9% purity can be obtained by this method. However, the use of $CS_2$ is not desirable due to its flammability and toxicity.

Zhou et al. have reported in Carbon, 32, 935 (1994) that $C_{60}$ of purity higher than 99.5% and $C_{70}$ of purity greater than 98% can be separated from the crude fullerene soot extract via crystallization in organic solvents such as o-xylene, carbon disulfide and 1,3-diphenylacetone. However, these crystallization separation practices were generally developed by trial and error and the underlying principle for these methods were not well explained and understood. This lack of understanding greatly hinders the scale-up of the corresponding process for mass production and separation of highly pure $C_{60}$ and $C_{70}$.

Atwood et al. have reported in Nature, 368, 229 (1994); and in U.S. Pat. No. 5,711,927, that both $C_{60}$ and $C_{70}$ can form discrete complexes with calixarenes, bowl-shaped macrocycles with hydrophobic cavities. Therefore complexation of p-Bu$^t$-calyx[8]arene with a mixture of the toluene extract of crude fullerene soot, followed by a series of re-crystallizations provides over 99.5% pure $C_{60}$ with a substantial reduction in the cost of purifying $C_{60}$ and $C_{70}$. However, this method does not yield pure $C_{70}$.

In addition to the above literature, Japanese Laid-open Patent Publication No. 2004-244245 discloses a method and an apparatus for continuously isolating a specific fullerene in a crystal phase. The method and apparatus include charging a solution of fullerene in a crystallization column, evaporating and removing a solvent in the upper part of the crystallization column, preferentially depositing the specific fullerene to settle in the lower part of the crystallization column, condensing the evaporated and removed solvent in a condenser, and returning part or whole of the removed solvent to the lower part of the crystallization column to cause rising flow in the crystallization column to bring the crystal phase into countercurrently contact with the solvent phase, thereby increasing the purity of the specific fullerene in the crystal phase. However, the isolation method and apparatus provided in the Japanese patent publication are only applicable when the system of $C_{60}$, $C_{70}$ and the solvent shows a solid solution behavior.

Although crystallization techniques such as melt crystallization and solution crystallization, and the associated unit operations have been well known in the field, the process configuration for separating a particular mixture of compounds depends on the specific behavior of the mixture (namely, the solid-liquid equilibrium phase behavior) and thus had to be developed on a case-by-case basis.

Accordingly, there is an important need to develop a process for separating highly pure fullerenes from a mixture of fullerenes by crystallization based on a solid-liquid equilibrium phase diagram of the relevant mixture of fullerenes system. In particular, it is advantageous to develop a process that can simultaneously isolate two highly pure fullerenes from a mixture of fullerenes that mainly contain the two components. Successful commercialization of such processes will also have a significant economic impact.

SUMMARY OF THE INVENTION

The inventors have discovered a method of simultaneously separating two highly pure fullerenes, which can have purities up to 99.99%, from a mixture of fullerenes that mainly contain the two components, wherein the phase equilibrium behavior of the feed stream or feed solution in a crystallizer determines the process configuration. Accordingly, it is an object of the present invention to provide a method for simultaneously separating two highly pure fullerenes from a mixture of fullerenes via crystallization based on the solid-liquid equilibrium (SLE) diagram (phase behavior) of the fullerene-solvent system.

Accordingly, there is provided a method for separating two highly pure fullerenes from a mixture of fullerenes comprising crystallizing a first fullerene component in a first crystallizer and a second fullerene component in a second crystallizer, wherein the phase equilibrium behavior of the mixture fed to a crystallizer is characterized by a region(s) where pure fullerenes, solid solutions or the solvates of the two fullerenes can be crystallized out.

In an alternative embodiment, there is provided a method for separating and purifying two highly pure fullerenes from a mixture of fullerenes via crystallization, which comprises the steps of: adjusting the amount of a solvent in the mixture fed to a first crystallizer to obtain a phase equilibrium behavior such that a first fullerene component of the two fullerenes, in the form of pure crystal, solid solution crystal, or solvate crystal is obtained during crystallization and separated out from the mixture; and adjusting the amount of a solvent in the remaining mixture fed to a second crystallizer, operating at a different temperature compared to the first crystallizer, to obtain a phase equilibrium behavior such that a second fullerene component of the two fullerenes, in the form of pure crystal, solid solution crystal, or solvate crystal is obtained during crystallization. Both of the methods can comprise an additional step of purifying the solid solution or the solvate into a highly pure fullerene final product, when the solid product from the crystallizers is in the form of solid solution or solvate.

The method of the present invention allows a simultaneous and continuous production of two highly pure fullerenes in large scale, with relatively low production and separation cost. Also, the method can be applied for various two fullerenes-solvent systems.

Other objects, charateristics and aspects of the present invention are discussed in greater detail below.

BRIEF DESCRIPTION OF THE DRAWINGS

The preferred embodiments are disclosed in connection with the attached Figures in which:

FIG. 1(*b*) illustrates an isothermal phase equilibrium diagram for the ternary system of two fullerenes and a solvent where a solid compound of two fullerenes is formed, according to one embodiment of the present invention where pure solid fullerenes are crystallized out.

FIG. 1(*c*) illustrates an isothermal phase equilibrium diagram for the ternary system of two fullerenes and a solvent where one solid solution region is formed, according to one embodiment of the present invention where solid solutions of the fullerenes are crystallized out.

FIG. 1(*d*) illustrates an isothermal phase equilibrium diagram for the ternary system of two fullerenes and a solvent where two solid solution regions are formed, according to one embodiment of the present invention where solid solutions of the fullerenes are crystallized out.

FIG. 1(*e*) illustrates an isothermal phase equilibrium diagram for the ternary system of two fullerenes and a solvent according to one embodiment of the present invention where solvates of the fullerenes are crystallized out.

FIG. 1(*f*) illustrates an isothermal phase equilibrium diagram for the ternary system of two fullerenes and a solvent according to one embodiment of the present invention where a solid solution and a solvate of the fullerenes are crystallized out.

FIG. 4(*b*) is an isothermal phase equilibrium diagram for the ternary system of two fullerenes and a solvent with the presence of a solid compound, showing the composition of the process streams for the system described in FIG. 3.

FIG. 6(b) is an isothermal phase equilibrium diagram for the ternary system of two fullerenes and a solvent with two solid solution regions, showing the composition of the process streams for the system described in FIG. 5.

DETAILED DESCRIPTION OF THE INVENTION

Figure 1:
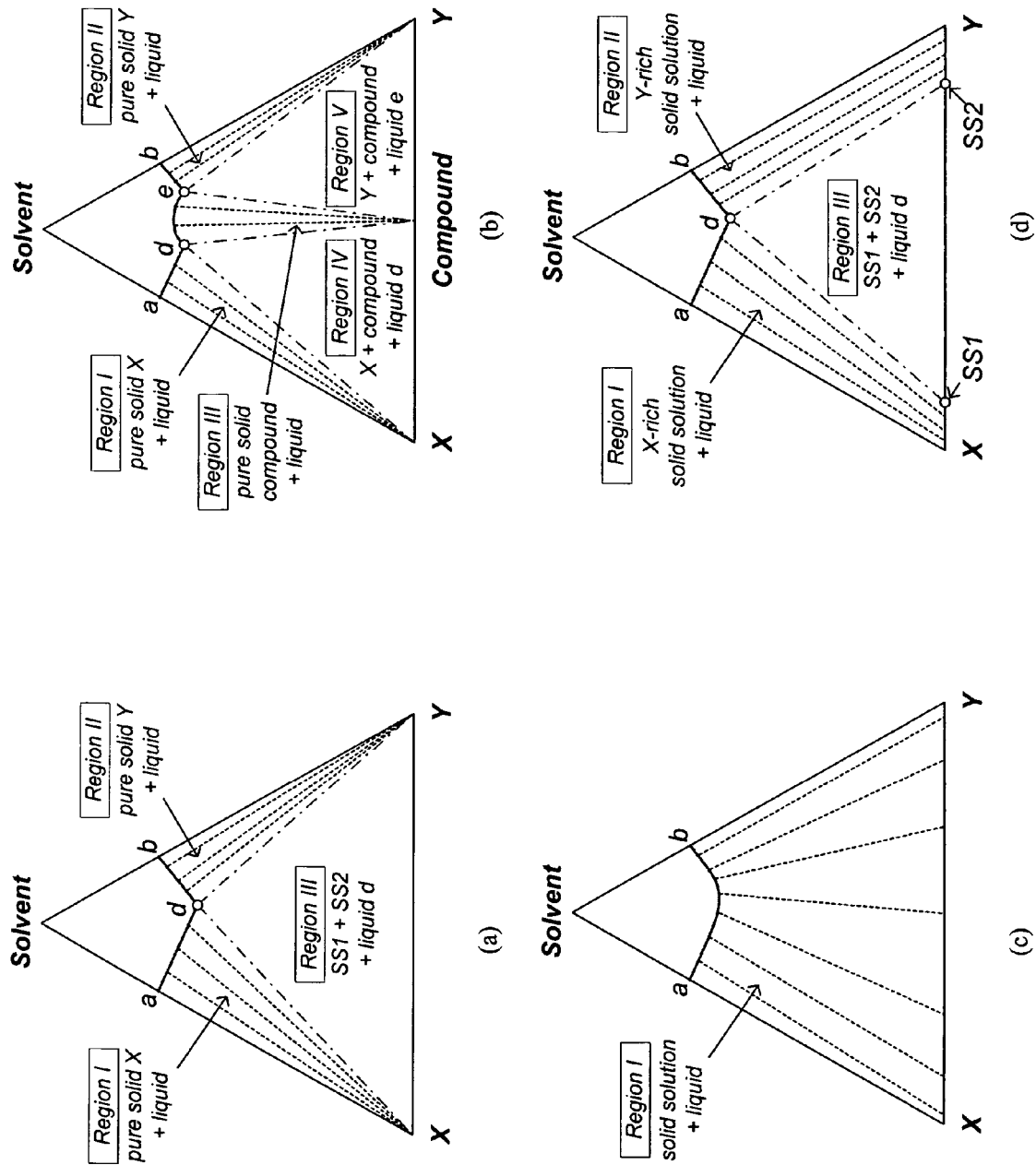
FIG. 1(*a*) illustrates an isothermal phase equilibrium diagram for the ternary system of two fullerenes and a solvent according to one embodiment of the present invention where pure solid fullerenes are crystallized out.
Figure 1:
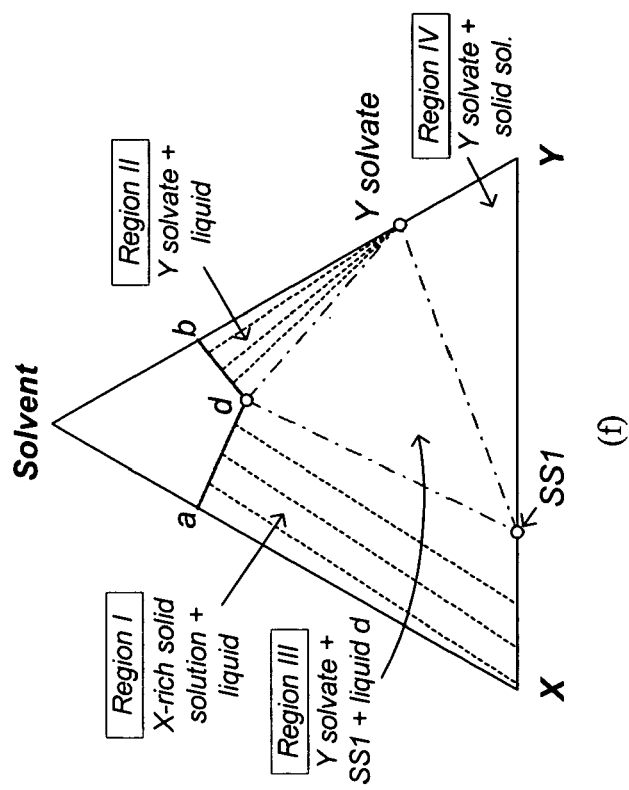
Figure 1:
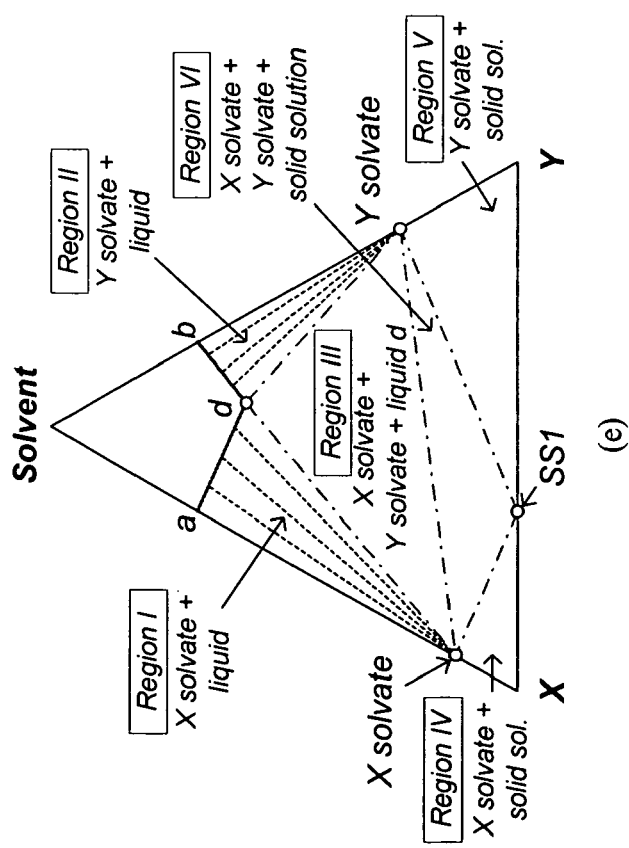

In the present invention, "a mixture of fullerenes" refers to a mixture of fullerenes including substituted and unsubstituted $C_{60}$, $C_{70}$, $C_{76}$, $C_{84}$, and other higher and lower molecular weigh fullerenes represented by $C_{20+2m}$ where m is an integer. This mixture of fullerenes can be obtained by any conventional methods, for example, a carbon arc method. Therefore, it should be understood by those of ordinary skill in the art that the system of the present invention may include other components or solutes such as other fullerenes previously discussed, byproducts, and the like. However, for purposes of the present invention only three primary components in the solution are of concern—two fullerenes and a solvent.

The two fullerenes, which are further referred to as fullerene X and fullerene Y, respectively, can represent any fullerenes selected from the group consisting of $C_{60}$, $C_{70}$, $C_{76}$, $C_{84}$ and other higher and lower molecular weigh fullerenes represented by $C_{20+2m}$ where m is an integer, with X being different from Y. In one aspect, fullerenes X and Y represent $C_{60}$ and $C_{70}$, respectively.

The solvent refers to an organic compound in which both fullerenes X and Y are soluble, and thus the system is characterized as a ternary phase equilibrium system. The organic compound used as a solvent may include, but is not limited to, 1,2-dimethylbenzene, 1,3-dimethylbenzene, 1,4-dimethylbenzene, toluene, 1,2,3-trimethylbenzene, 1,2,4-trimethylbenzene, 1,2,3,4-tetramethylbenzene, 1,2,3,5-tetramethylbenzene, 1,2,3,4-tetrahydronaphthalene, 1-methylnaphthalene, styrene, tetrachloromethane, 1,1,2,2-tetrachloroethane, chlorobenzene, 1,2-dichlorobenzene, 1,3-dichlorobenzene, 1,2,4-trichlorobenzene, bromobenzene tribromomethane, 1-chloronaphthalene, iodobenzene and pyrrolidine, benzene, ethylbenzene, n-propylbenzene, isopropylbenzene, n-butylbenzene, sec-butylbenzene, tert-butylbenzene, 1-methylnaphthalene, 1-bromo-2-methylnaphthalene, quinoline, pyridine and thiophene. In an aspect, when the fullerenes X and Y are $C_{60}$ and $C_{70}$ respectively, the solvent can 1,2-dimethylbenzene, 1,3-dimethylbenzene, 1,4-dimethylbenzene, toluene, 1,2,3-trimethylbenzene, 1,2,4-trimethylbenzene, 1,2,3,4-tetramethylbenzene, 1,2,3,5-tetramethylbenzene, 1,2,3,4-tetrahydronaphthalene, 1-methylnaphthalene, styrene, tetrachloromethane, 1,1,2,2-tetrachloroethane, chlorobenzene, 1,2-dichlorobenzene, 1,3-dichlorobenzene, 1,2,4-trichlorobenzene, bromobenzene tribromomethane, 1-chloronaphthalene, iodobenzene and pyrrolidine.

The phase behaviors of various ternary systems are different depending on the two fullerenes in the mixture and the choice of solvent. The ternary phase behavior is determined by the phase behavior of the three binary pairs that make up the ternary system, namely X-Y, X-solvent, and Y—solvent. The binary phase behavior of the X-Y system can involve mixed solid phases with variable compositions, which are referred to as "solid solutions". It can also involve a solid compound between X and Y.

Depending on the solvent, the phase behavior of a fullerene-solvent binary system, where the fullerene can be X or Y, is characterized by one or more compounds between the fullerene and the solvent, which are referred to as "solvates". For example, $C_{60}$ and $C_{70}$ crystallize in the form of a bisolvate as $C_{60}\cdot o\text{-}C_6H_4(CH_3)_2$ and $C_{70}\cdot o\text{-}C_6H_4(CH_3)_2$ respectively from o-xylene at $-20°$ C. (Arapov et al., "Solubility in the Fullerene $C_{60}$-Fullerene $C_{70}$-o-$C_6H_{14}(CH_3)_2$ System", *Russ. J. Appl. Chem.*, 76, 33 (2003)). The solvates may be present only over a certain range of temperature, and do not form outside that range of temperature. Therefore, there are several possible isothermal phase diagrams of the ternary system X-Y-solvent, as shown in FIG. 1. It should be noted that all phase diagrams shown herein are not to scale but are presented here for schematic illustration purposes only.

A further embodiment of the present invention will be explained hereafter with reference to the accompanying drawings, but it is to be understood that the present invention is not restricted to any particular embodiment described herein.

FIG. 1(a) shows the isothermal phase equilibrium diagram for the ternary system of two fullerenes and a solvent where pure solid fullerenes are crystallized out. In FIG. 1(a), the two fullerenes X and Y do not form a solid solution at any composition and neither X nor Y forms a solvate with the solvent. The phase diagram is characterized by three different regions of compositions in which solid products are obtained. In region 1, any mixture will phase-split into a liquid phase with a composition along line ad and a pure X solid phase. The compositions of the phases are determined by the tie-line passing through the mixture composition. As an example, three tie-lines (shown as dotted lines) are shown in this region in FIG. 1(a). The solid along the tie-line will have the composition of where the tie-line crosses the bottom of the triangle (pure X in this case), while the liquid along the tie-line will have the composition of where the tie-line crosses line ab in the diagram. This is true for any tie-line shown in any of the phase diagrams described herein.

Likewise, in region II, any mixture will phase-split into a liquid phase with a composition along line bd and a pure Y solid phase. Three tie-lines are also shown in region II in FIG. 1(a) as an example. In region III, any mixture will split into three phases: two solid phases—pure solid X and pure solid Y—and a liquid phase with composition given by point d, which is referred to as the "double saturation point" at the specified temperature.

FIG. 1(b) shows the isothermal phase equilibrium diagram for the ternary system of two fullerenes and a solvent where a solid compound of the two fullerenes is formed. In FIG. 1(b), two fullerenes X and Y form a solid compound. The phase diagram is characterized by five different regions of compositions in which solid products are obtained. In region I, any mixture will phase-split into a liquid phase with a composition along line ad and a pure X solid phase. The compositions of the phases are determined by the tie-line passing through the mixture composition. Two tie-lines are shown in FIG. 1(b) as an example. Similarly, in region II, any mixture will phase-split into a liquid phase with a composition along line be and a pure Y solid phase. In region III, any mixture will phase-split into a liquid phase with a composition along line de and a pure solid compound formed by X and Y. Generally, operations inside this region are not desirable since it is difficult to convert the solid compound of X and Y back to pure X and pure Y solid phases. In region IV, any mixture will split into three phases: two solid phases—pure X and pure solid compound of X and Y—and a liquid phase with composition given by the double saturation point d. In a similar way, any mixture in region V will split into three phases: two solid phases—pure Y and pure solid compound of X and Y—and a liquid phase with composition given by another double saturation point e.

FIG. 1(c) shows the isothermal phase equilibrium diagram for the ternary system of two fullerenes and a solvent where one solid solution region is formed. In FIG. 1(c), two fullerenes X and Y form a solid solution at all compositions and neither X nor Y forms a solvate with the solvent. The phase diagram is characterized by only one region of compositions in which a solid product is obtained. In region 1, any mixture will phase-split into a liquid phase with a composition along line ab and a solid solution phase. The compositions of the phases are determined by the tie-line passing through the mixture composition as explained above.

FIG. 1(d) shows the isothermal phase equilibrium diagram for the ternary system of two fullerenes and a solvent where two solid solution regions are formed. In FIG. 1(d), two fullerenes X and Y form solid solutions at some compositions and neither X nor Y forms a solvate with the solvent. The phase diagram is characterized by three different regions of compositions in which solid products are obtained. In region I, any mixture will phase-split into a liquid phase with a composition along line ad and a solid solution phase which is rich in X. The compositions of the phases are determined by the tie-line passing through the mixture composition. In region II, any mixture will phase-split into a liquid phase with a composition along line bd and a solid solution phase which is rich in Y. In region III, any mixture will split into three phases: two solid solutions with compositions SS1 and SS2, respectively, and a liquid phase with composition given by the double saturation point d.

FIG. 1(e) shows the isothermal phase equilibrium diagram for the ternary system of two fullerenes and a solvent where solvates of the fullerenes are crystallized out. In FIG. 1(e), two fullerenes X and Y form a solid solution at some compositions and both X and Y form solvates with the solvent. The phase diagram is characterized by six regions of compositions in which solid products are obtained. In region I, any mixture will phase-split into a liquid phase with a composition along line ad and a pure X solvate solid phase. Similarly, in region II, any mixture will phase-split into a liquid phase with a composition along line bd and a pure Y solvate solid phase. In region III, any mixture will split into three phases: a liquid phase with a composition given by point d and two pure solid phases, namely X solvate and Y solvate. In regions IV, V, and VI, a mixture of two or three solid phases will be obtained. In general, operation inside regions IV, V and VI is not desirable since it is difficult to separate the resulting solid phases.

FIG. 1(f) shows an isothermal phase equilibrium diagram for the ternary system of two fullerenes and a solvent where a solid solution and a solvate of the fullerenes are crystallized out. In FIG. 1(f), two fullerenes X and Y form a solid solution at some compositions and one of them forms a solvate with the solvent. The phase diagram is characterized by four different regions of compositions in which solid products are obtained. In region I, any mixture will phase-split into a liquid phase with a composition along line ad and a solid solution phase which is rich in X. In region II, any mixture will phase-split into a liquid phase with a composition along line bd and a pure Y solvate solid phase. In region III, any mixture will split into three phases: a liquid phase with a composition given by point d and two solid phases, namely a solid solution and pure Y solvate. In region IV, a mixture of two solid phases will be obtained. Again, operation in region IV is not desirable.

Reference is now made to the following examples of the specific embodiments of the present invention. In an embodiment, the present invention provides a system wherein the phase equilibrium behavior of the feed mixture in a crystallizer is selectively controlled and adjusted to produce a pure fullerene, a solid solution, or a solvate. The solid solution or solvate, if formed, is further treated to give a highly pure fullerene as the final product. This provides a powerful tool, whereby certain operating conditions or variables of the process can be selectively adjusted to generate the desired phase equilibrium behavior.

More specifically, by choosing an appropriate solvent, one can manipulate the phase behavior of the ternary system to conform to one of those shown in FIGS. 1(a)-1(f). It should be noted that depending on the binary phase behavior between the two fullerenes to be separated, not all phase behaviors in FIGS. 1(a)-1(f) may be obtained for a given mixture of fullerenes.

In an embodiment, the present invention provides a method for simultaneously separating two highly pure fullerenes from a mixture of fullerenes that mainly contains the two desired fullerenes. The process comprises two key steps: adjusting the amount of the solvent in the mixture fed to a crystallizer to obtain a phase equilibrium behavior such that one of the fullerenes, in the form of pure crystals, solid solution crystals, or solvate crystals is obtained during crystallization; and adjusting the amount of the solvent in the mixture fed to another crystallizer, operating at a different temperature compared to the first one, to obtain a phase equilibrium behavior such that the other fullerene, in the form of pure crystals, solid solution crystals, or solvate crystals is obtained during crystallization. If any of the solid products is in the form of a solvate, then the process also involves additional step of removing the solvent from the solvate such that a highly pure fullerene final product is obtained. If any of the solid products are in the form of a solid solution, then the process also involves additional step for purifying the solid solution into a highly pure fullerene final product.

Figure 2:
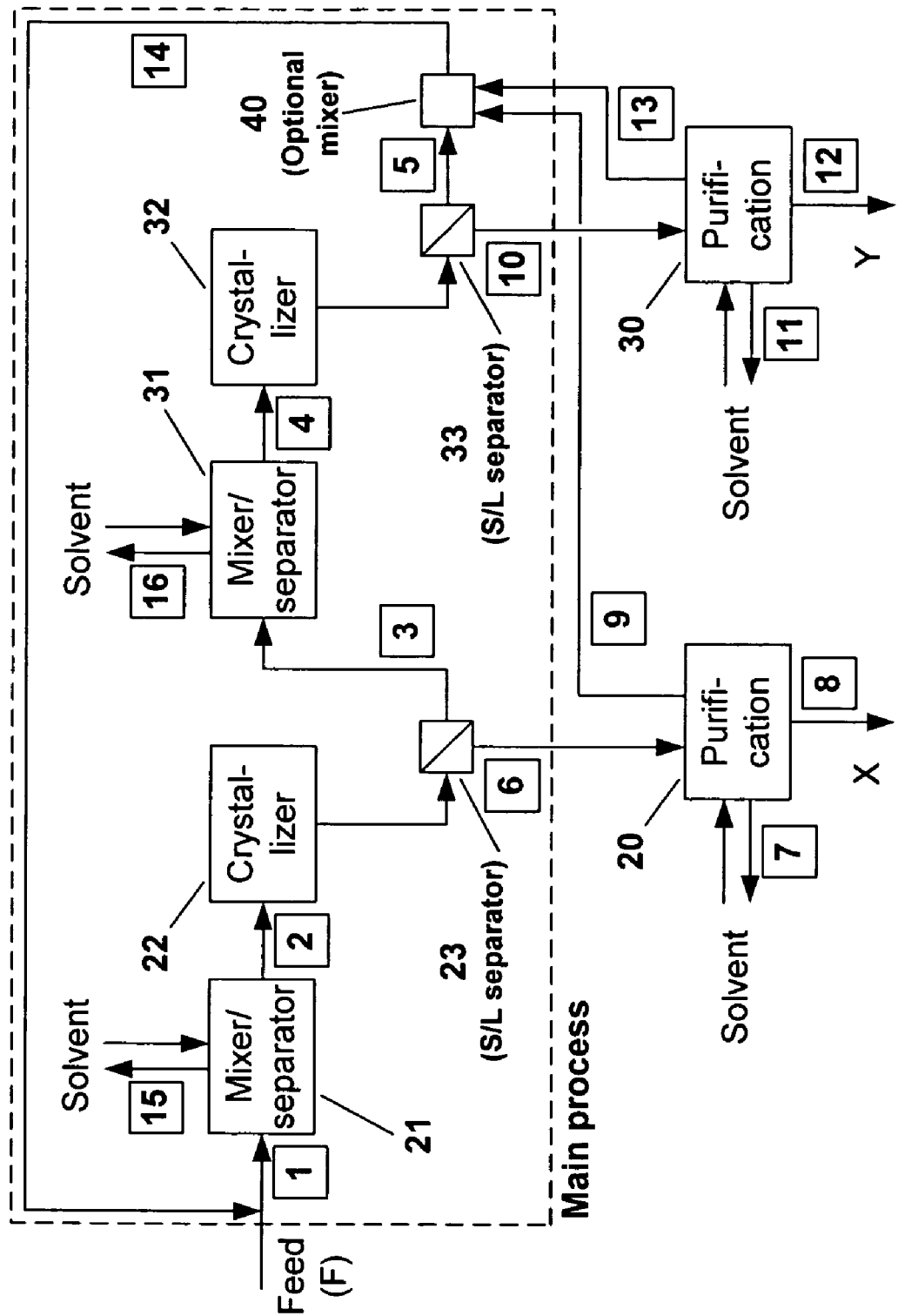
FIG. 2 illustrates a general process for separating two highly pure fullerenes according to the present invention.

More specifically, as shown in FIG. 2, the general process for the method provided in the present invention comprises a main process block, which comprises a first mixer/separator unit 21, a first crystallizer 22, a first solid/liquid separator 23, a second mixer/separator unit 31, a second crystallizer 32, and a second solid/liquid separator 33. The feed mixture entering this main process block is first mixed with a recycle stream 14 comprised of the mixture coming from mixer 40 to give stream 1, the composition of which is then adjusted by adding or removing solvent (stream 15) in the mixer/separator 21 prior to entering crystallizer 22 to establish a feed solution (stream 2) having a composition at a location within the region where pure X, X solvate, or a solid solution is formed upon crystallization.

Having achieved the desired feed composition for crystallization of pure X, X solvate, or a solid solution, the solution is fed to the first crystallizer 22 whereupon the temperature is adjusted to $T_1$. Crystallizers are known in the art, and typically provide cooling by indirect or external cooling such as with heat exchanges or circulating cooling medium. Cooling may also be provided by pressure reduction, or by a combination of external cooling and pressure reduction.

The solid crystals are separated from the remaining solution (referred to as a mother liquor) in the first solid/liquid separator 23. Any suitable type of solid/liquid separator may be used such as a centrifuge or a filtration device and the like. Upon separation, pure X, X solvate, or a solid solution (stream 6) is obtained. The mother liquor (stream 3) is conveyed to the mixer/separator 31 where solvent (stream 16) is added or removed to adjust the feed composition as desired prior to crystallization.

Having achieved the desired feed composition for crystallization of pure Y, Y solvate, or another solid solution, the solution is fed to the second crystallizer 32 whereupon the temperature is adjusted to $T_2$, which is in general different from $T_1$. Again, any suitable crystallizer and method for providing cooling may be used. The solid crystals are separated from the mother liquor in the second solid/liquid separator 33. Again, any suitable type of solid/liquid separator may be used. Upon separation, pure Y, Y solvate, or a solid solution (stream 10) is obtained. The mother liquor (stream 5) may be sent to an optional mixer 40, where it may be mixed with recycle streams 9 and 13 to produce stream 14 which is recycled and mixed with the fresh feed.

The process provided in the present invention may also include two purification process block 20 and 30, the contents of which depend on whether the crystallizers produce pure fullerenes, fullerene solvates, or solid solutions. Solvent (streams 7 and 11) can be added to or removed from the solid crystals from crystallizers 22 and 32 (stream 6 and 10, respectively) to produce the final solid products (stream 8 and 12). Liquid recycle streams 9 and 13 may be generated from the purification process.

Figure 3:
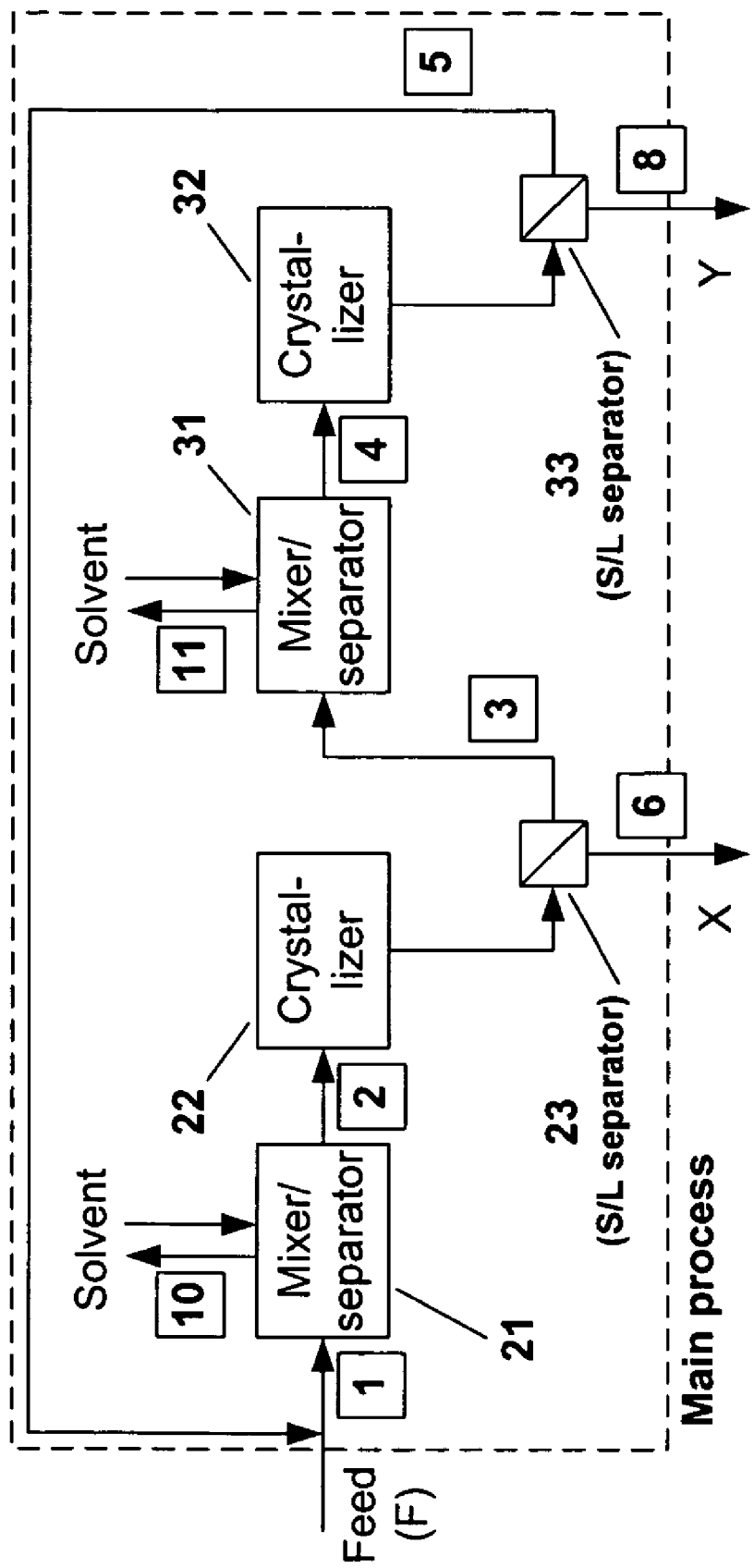
FIG. 3 illustrates a schematic diagram of a method according to the present invention, wherein the phase behavior of the ternary system is characterized by regions where pure solid fullerenes can be crystallized out.

In yet another embodiment, the present invention provides a process for simultaneously separating two highly pure fullerenes from a mixture of fullerenes that mainly contains the two fullerenes, wherein the phase behavior of the ternary system comprising the two fullerenes and a solvent is characterized by regions where the pure solid fullerenes can be crystallized out, similar to that shown in FIG. 1(a) or FIG. 1(b). As shown in FIG. 3, the process comprises only the main process block as described previously with respect to FIG. 2. Pure solids X and Y are obtained from crystallizers 22 and 32, and thus the purification process blocks shown in FIG. 2 are not necessary.

A requirement for the inventive process of this embodiment to work is that the solvent-free composition of the double saturation point d in FIG. 1(a) has to change with temperature. In other words, if the solvent-free composition at temperature $T_1$ is $m_1$% X and at temperature $T_2$ is $m_2$% X, then the process shown in FIG. 3 only works if $m_1$ is not the same as $m_2$. In an exemplary embodiment shown in FIG. 4(a), the ternary phase behavior of such a system is characterized by two sets of saturation curves at two different temperatures $T_c$ and $T_h$, with the solvent-free composition of the double saturation point at $T_c$ comprising more X compared to that at $T_h$. It should be noted that tie-lines at each temperature are not drawn on the phase diagram to maintain clarity. In this exemplary embodiment, the composition of the crystallizer feed is adjusted from a composition corresponding to point 1 on FIG. 4(a) to a composition corresponding to point 2 by the removal of solvent, so that point 2 is located within the region where pure X can be crystallized out. It should also be noted that if the ternary phase behavior was different, the solvent adjustment may have to be accomplished by the addition of solvent for the composition of point 2 to arrive at the desirable region instead of the removal of solvent.

Figure 4:
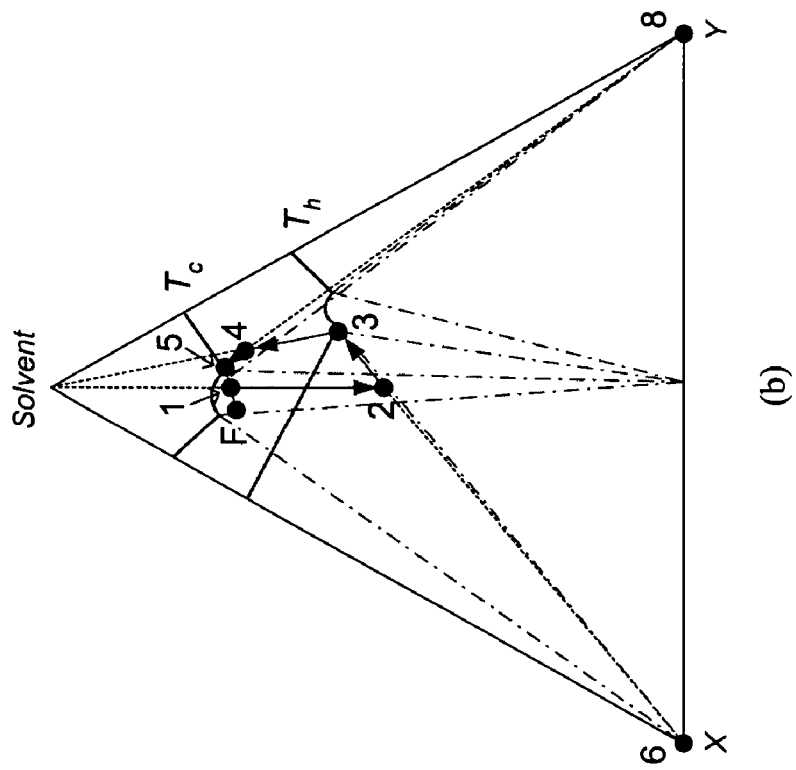
FIG. 4(*a*) illustrates an isothermal phase equilibrium diagram for the ternary system of two fullerenes and a solvent without the presence of a solid compound, showing the composition of the process streams for the system described in FIG. 3.
Figure 4:
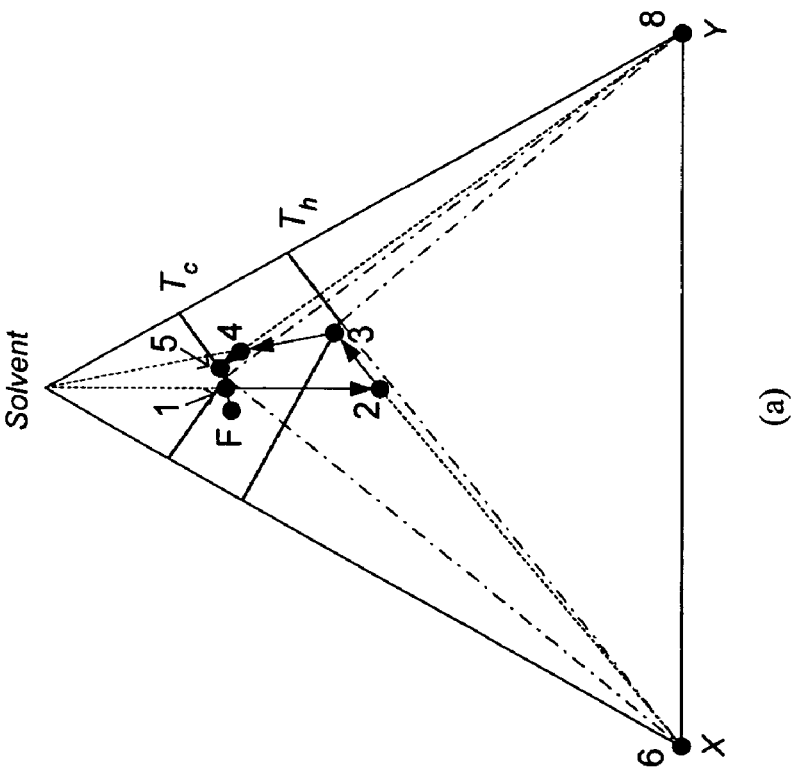

Crystallization of pure X gives a mother liquor with composition corresponding to point 3 on FIG. 4(a). After separating the solids from the mother liquor, the composition of the mother liquor is adjusted to a composition corresponding to point 4 by the addition of solvent, so that point 4 is located within the region where pure Y can be crystallized out. Note that if the ternary phase behavior was different, the solvent adjustment may have to be accomplished by the removal of solvent. Crystallization of pure Y gives a mother liquor with a composition corresponding to point 5 in FIG. 4(a), which is recycled and mixed with fresh feed stream to provide stream 1.

If the phase behavior of the ternary system comprising the two fullerenes and a solvent is characterized by regions where a compound between the two pure fullerenes can be crystallized out, similar to that shown in FIG. 1(b), then an additional requirement for the process to work is that the solvent-free composition of the two double saturation points d and e in FIG. 1(b) has to significantly change with a change in temperature such that, if the solvent-free composition of point d at temperature $T_1$ is $m_1$% X and at temperature $T_2$ is $m_2$% X, while the solvent-free composition of point e at temperature $T_1$ is $n_1$% X and at temperature $T_2$ is $n_2$% X, then either $n_1 > m_2$ or $n_2 > m_1$ It should be noted here that points d and e in FIG. 1(b) are non-interchangeable, thus it must be the case that $m_1 > n_1$ and $m_2 > n_2$. In an exemplary embodiment shown in FIG. 4(b), the ternary phase behavior of such a system is characterized by two sets of saturation curves at two different temperatures $T_c$ and $T_h$, with the solvent-free composition of the double saturation point e at $T_c$ comprising more X compared to that of the double saturation point d at $T_h$. Again, tie-lines at each temperature are not drawn on the phase diagram to maintain clarity. The steps involved in the process are exactly the same as for the exemplary embodiment shown in FIG. 4(a) as set forth above.

Figure 5:
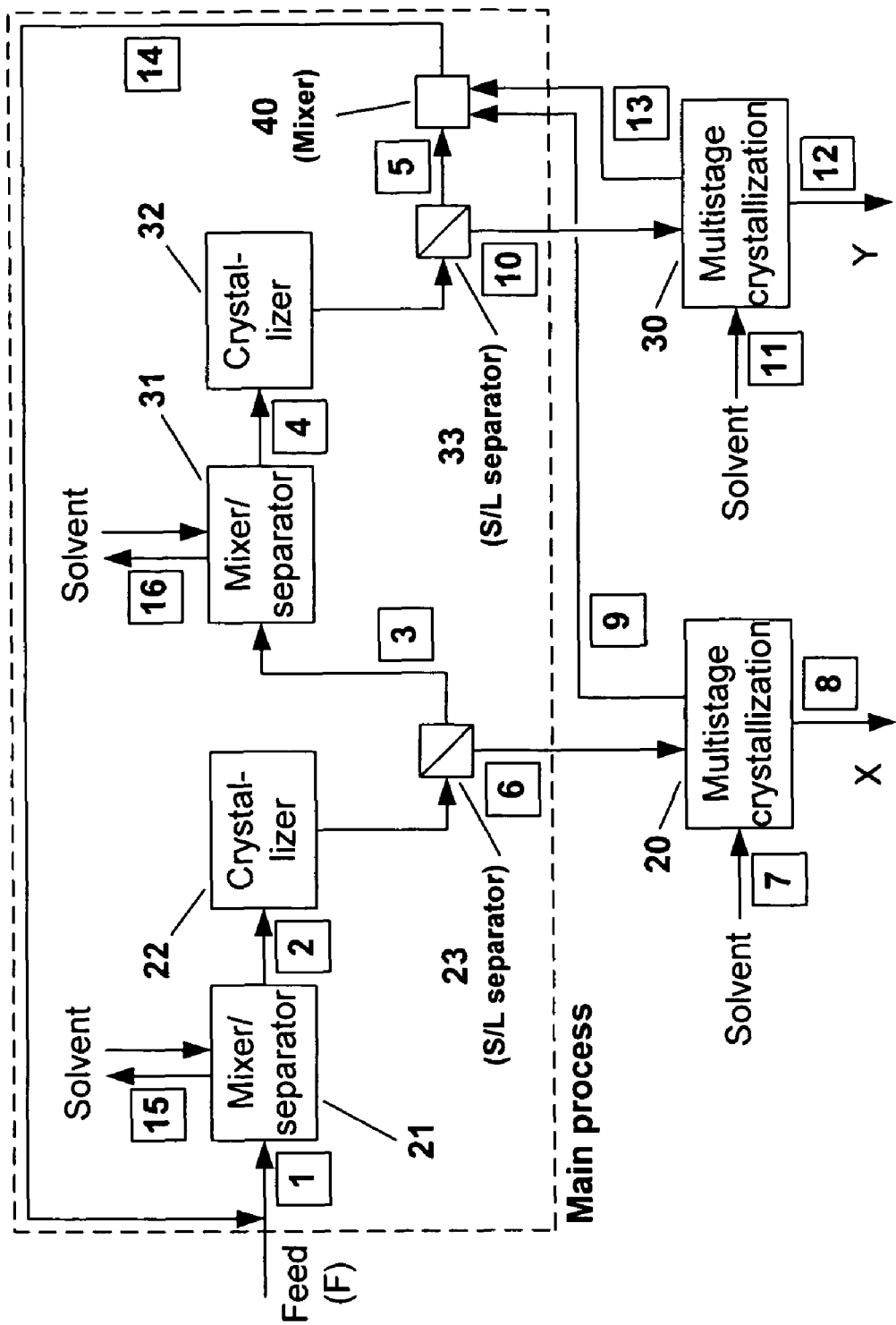
FIG. 5 is a schematic diagram of a method according to the present invention, wherein the phase behavior of the ternary system is characterized by regions where solid solutions can be crystallized out.

In a further embodiment, the present invention provides a method for separating two highly pure fullerenes from a mixture of fullerenes that mainly contains the two fullerenes, wherein the phase behavior of the ternary system comprising the two fullerenes and a solvent is characterized by at least one region where a solid solutions can be crystallized out, similar to that shown in FIG. 1(c) or FIG. 1(d). As shown in FIG. 5, the process comprises the main process block as described previously with respect to FIG. 2, as well as two multistage crystallization steps 20 and 30 in place of the purification blocks shown in the general process of FIG. 2. Solid solutions with different compositions are obtained from crystallizers 22 and 32, and fed to the multistage crystallizers 20 and 30. After the addition of solvent, the multistage crystallization step provides pure fullerenes and recycles streams 9 and 13 which are recycled to the main process block.

Figure 6:
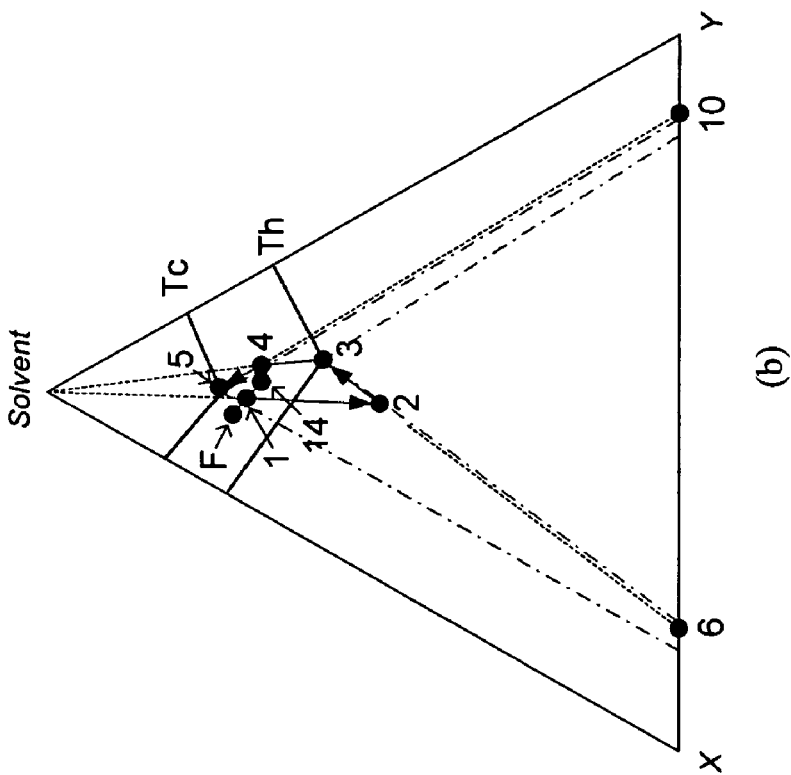
FIG. 6(*a*) is an isothermal phase equilibrium diagram for the ternary system of two fullerenes and a solvent with one solid solution region, showing the composition of the process streams for the system described in FIG. 5.
Figure 6:
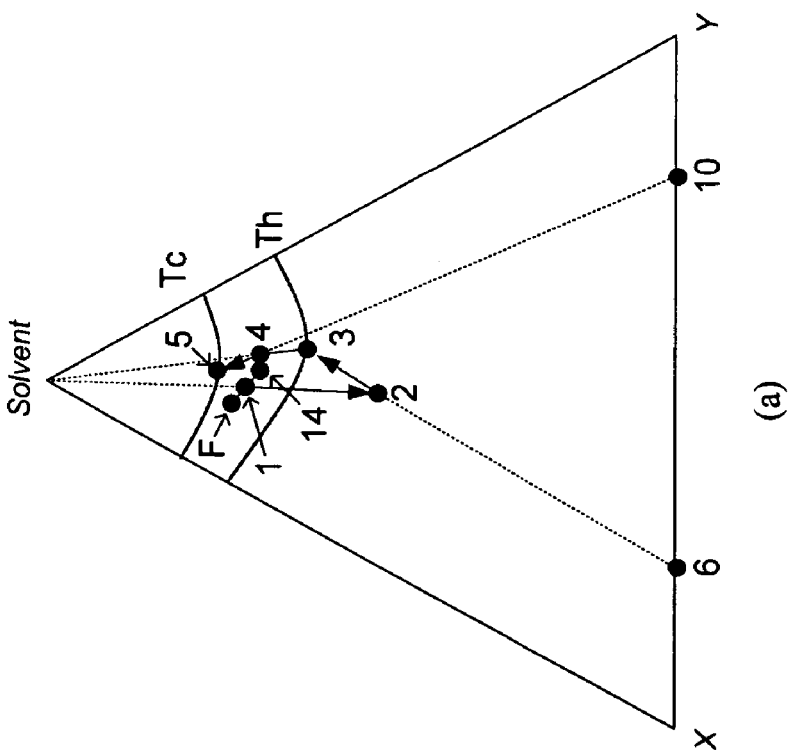

If the phase behavior of the ternary system comprising the two fullerenes and a solvent is characterized by only one solid solution region, similar to that shown in FIG. 1(c), then a requirement for the process to work is that there must be two "crossing over" tie-lines. Such "crossing-over" behavior is defined as follows: if a tie-line at temperature $T_1$ connects a liquid with solvent-free composition $l_1$% X and a solid solution with composition $s_1\%$ X, and another tie-line at temperature $T_2$ connects a liquid with solvent-free composition $l_2\%$ X and a solid solution with composition $s_2\%$ X, then the two tie-lines are said to be "crossing-over" if $s_1>l_2>s_2$ or $s_1<l_2<l_1<s_2$. In an exemplary embodiment shown in FIG. 6(a), the ternary phase behavior of such a system is characterized by two saturation curves at two different temperatures $T_c$ and $T_h$, with tie-lines 3-6 at temperature $T_h$ and 5-10 at temperature $T_c$ showing "crossing-over" behavior. It should be noted that other tie-lines at each temperature are not drawn on the phase diagram to maintain clarity. In this exemplary embodiment, the composition of the crystallizer feed is adjusted from a composition corresponding to point 1 on FIG. 6(a) to a composition corresponding to point 2 by removal of solvent, so that point 2 is located on tie-line 3-6. It should also be noted that if the ternary phase behavior was different, the solvent adjustment may have to be accomplished by the addition of solvent for the composition of point 2 to arrive at the desirable location. Crystallization gives a solid solution with composition corresponding to point 6 on FIG. 6(a) and a mother liquor with composition corresponding to point 3. After separating the solids from the mother liquor, the composition of the mother liquor is adjusted to a composition corresponding to point 4 by the addition of solvent, so that point 4 is located on tie-line 5-10. Note that if the ternary phase behavior was different, the solvent adjustment may have to be done by the removal of solvent. Crystallization gives a solid solution with a composition corresponding to point 10 in FIG. 6(a) and a mother liquor with a composition corresponding to point 5, which is mixed with recycle streams 9 and 13 in mixer 40 to form stream 14. This stream 14 is then mixed with fresh feed stream to provide stream 1.

If the phase behavior of the ternary system comprising the two fullerenes and a solvent is characterized by two solid solution regions, similar to that shown in FIG. 1(d), then the requirement for the process to work is that the solvent-free composition of the double saturation point d in FIG. 1(d) has to change with temperature. In other words, if the solvent-free composition at temperature $T_1$ is $m_1\%$ X and at temperature $T_2$ is $m_2\%$ X, then the process shown in FIG. 5 only works if $m_1$ is not the same as $m_2$. In an exemplary embodiment shown in FIG. 6(b), the ternary phase behavior of such a system is characterized by two sets of saturation curves at two different temperatures $T_c$ and $T_h$, with the solvent-free composition of the double saturation point at $T_c$ comprising more X compared to that at $T_h$. It should be noted that tie-lines at each temperature are not drawn on the phase diagram to maintain clarity. In this exemplary embodiment, the composition of the crystallizer feed is adjusted from a composition corresponding to point 1 on FIG. 6(b) to a composition corresponding to point 2 by the removal of solvent, so that point 2 is located within the region where an X-rich solid solution can be crystallized out. It should also be noted that if the ternary phase behavior was different, the solvent adjustment may have to be accomplished by the addition of solvent for the composition of point 2 to arrive at the desirable region. Crystallization gives a solid solution with the composition corresponding to point 6 on FIG. 6(b) and a mother liquor with a composition corresponding to point 3. After separating the solids from the mother liquor, the composition of the mother liquor is adjusted to a composition corresponding to point 4 by the addition of solvent, so that point 4 is located within the region where a Y-rich solid solution can be crystallized out. Note that if the ternary phase behavior was different, the solvent adjustment may have to be accomplished by the removal of solvent. Crystallization gives a solid solution with a composition corresponding to point 10 in FIG. 6(b) and a mother liquor with a composition corresponding to point 5, which is mixed with recycle streams 9 and 13 in mixer 40 to form stream 14. This stream 14 is then mixed with fresh feed stream to provide stream 1.

Figure 7:
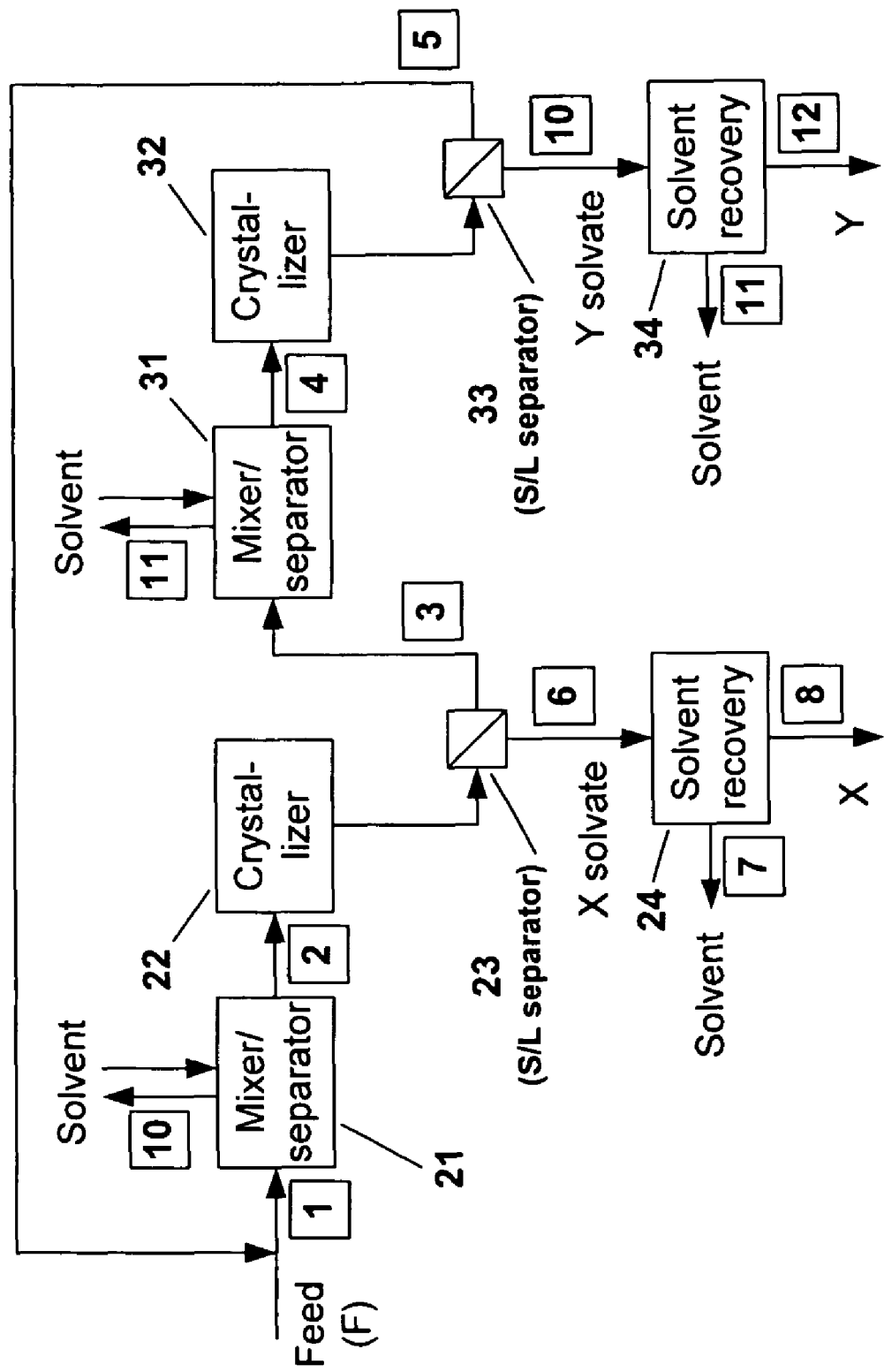
FIG. 7 is a schematic diagram of the method according to the present invention, wherein the phase behavior of the ternary system is characterized by regions where solvates can be crystallized out.

In a still further embodiment, the present invention provides a process for simultaneously separating two highly pure fullerenes from a mixture of fullerenes that mainly contains the two fullerenes, wherein the phase behavior of the ternary system comprising the two fullerenes and a solvent is characterized by regions where solvates of the two fullerenes can be crystallized out, similar to that shown in FIG. 1(e). As shown in FIG. 7, the process comprises the main process block as described previously with respect to FIG. 2, as well as two solvent recovery units 24 and 34 in place of the purification blocks shown in the general process of FIG. 2. Solvates are obtained from crystallizer 22 and 32, and fed to solvent recovery units 24 and 34, respectively, wherein solvent is removed and pure solid fullerenes (stream 8 and 12) are collected. Any suitable solvent recovery unit may be used, such as a dryer or a kiln.

Figure 8:
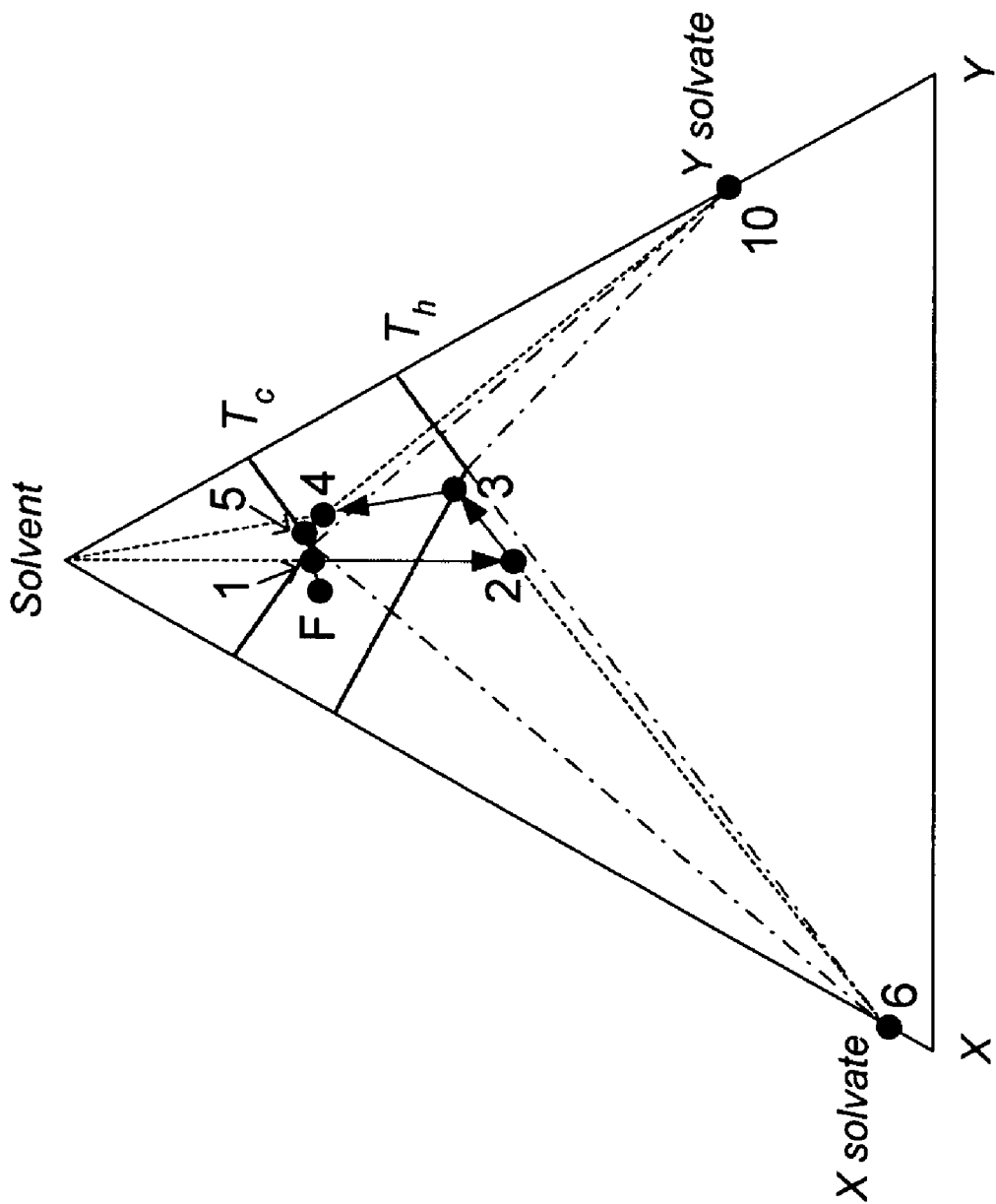
FIG. 8 is an isothermal phase equilibrium diagram for the ternary system of two fullerenes and a solvent, showing the composition of the process streams for the system described in FIG. 7.

A requirement for the process to work in this embodiment is that the solvent-free composition of the double saturation point d in FIG. 1(e) has to change with a change in temperature. In other words, if the solvent-free composition at temperature $T_1$ is $m_1\%$ X and at temperature $T_2$ is $m_2\%$ X, then the process shown in FIG. 7 only works if $m_1$ is not the same as $m_2$. In an exemplary embodiment shown in FIG. 8, the ternary phase behavior of such a system is characterized by two sets of saturation curves at two different temperatures $T_c$ and $T_h$, with the solvent-free composition of the double saturation point at $T_c$ comprising more X compared to that at $T_h$. It should be noted that tie-lines and solid-only regions at each temperature are not drawn on the phase diagram to maintain clarity. In this exemplary embodiment, the composition of the crystallizer feed is adjusted from a composition corresponding to point 1 on FIG. 8 to a composition corresponding to point 2 by the removal of solvent, so that point 2 is located within the region where X solvate can be crystallized out. It should also be noted that if the ternary phase behavior was different, the solvent adjustment may have to be accomplished by the addition of solvent for the composition of point 2 to arrive at the desirable region. Crystallization of X solvate gives a mother liquor with a composition corresponding to point 3 on FIG. 8. After separating the solids from the mother liquor, the composition of the mother liquor is adjusted to a composition corresponding to point 4 by the addition of solvent, so that point 4 is located within the region where Y solvate can be crystallized out. Note that if the ternary phase behavior was different, the solvent adjustment may have to be accomplished by the removal of solvent. Crystallization of Y solvate gives a mother liquor with a composition corresponding to point 5 in FIG. 8, which is recycled and mixed with fresh feed stream to provide stream 1.

Figure 9:
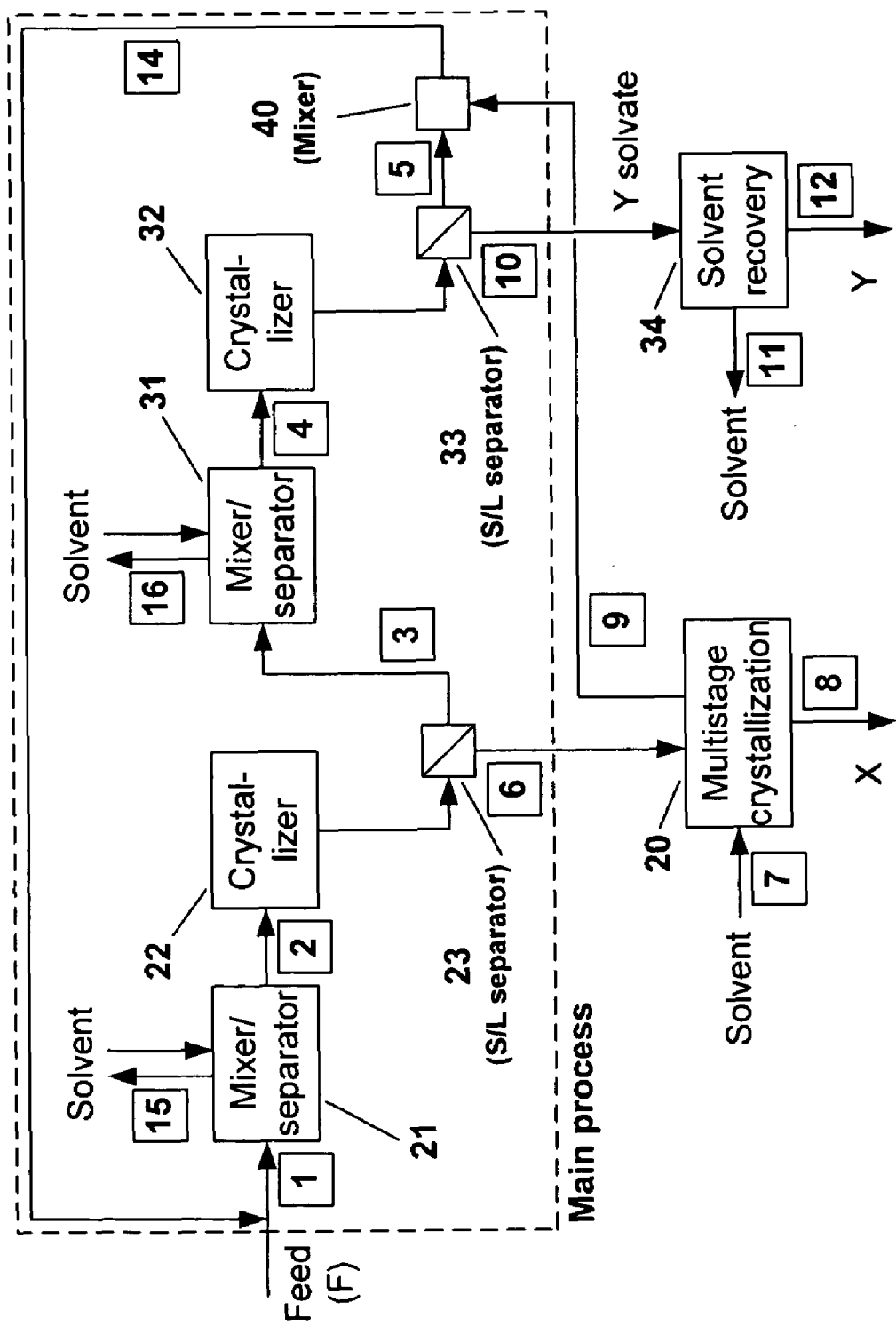
FIG. 9 is a schematic diagram of the method according to the present invention where the phase behavior of the ternary system is characterized by a region where a solid solution can be crystallized out and another region where a solvate can be crystallized out.

In a yet another embodiment, the present invention provides a method for simultaneously separating two highly pure fullerenes from a mixture of fullerenes that mainly contains the two fullerenes, wherein the phase behavior of the ternary system comprising the two fullerenes and a solvent is characterized by a region where a solid solution can be crystallized out and another region where a solvate can be crystallized out, similar to that shown in FIG. 1(f). As shown in FIG. 9, the process comprises the main process block as described previously with respect to FIG. 2, as well as a multistage crystallization step 20 and a solvent recovery unit 34 in place of the purification blocks shown in the general process of FIG. 2. A solid solution is obtained from crystallizer 22, and fed to the multistage crystallization 20. After the addition of solvent, the multistage crystallization step provides pure X (stream 8) and a recycle stream 9 which is recycled to the main process block. A solvate is obtained from crystallizer 32, and fed to the solvent recovery unit 34, wherein solvent is removed and pure Y (stream 12) is collected. Again, any suitable solvent recovery unit may be used. As apparent to those of ordinary skill in the art, the process of this embodiment is essentially a combination between those depicted in FIGS. 5 and 7, with a multistage crystallization step being used to purify a solid solution and a solvent recovery unit being used to remove solvent from a solvate.

Figure 10:
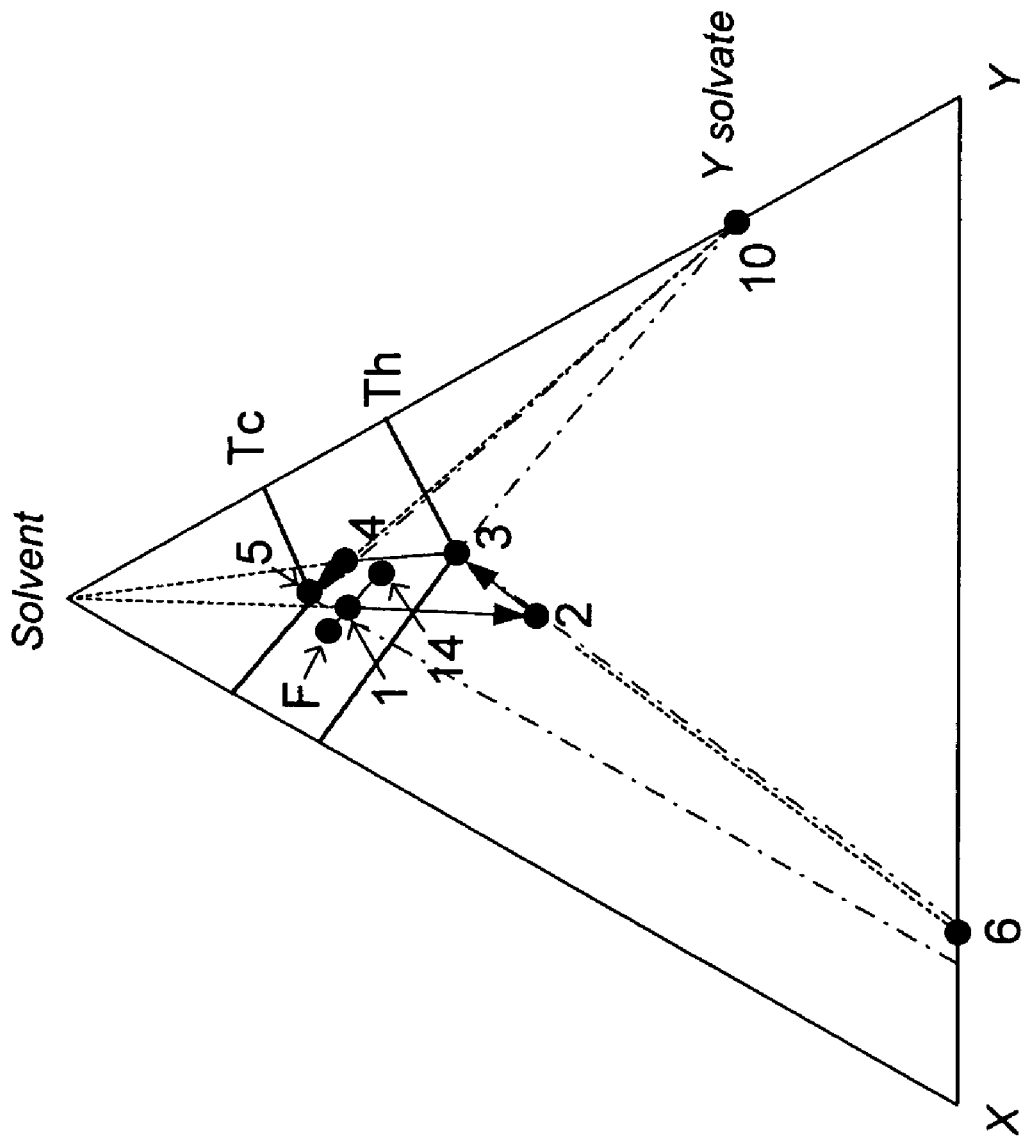
FIG. 10 is an isothermal phase equilibrium diagram for the ternary system of two fullerenes and a solvent, showing the composition of the process streams for the system described in FIG. 9.

As with systems wherein the ternary phase behavior is similar to that shown in FIG. 1(d) or FIG. 1(e), the requirement for the process of this embodiment to work is that the solvent-free composition of the double saturation point d in FIG. 1(f) has to change with a change in temperature. In an exemplary embodiment shown in FIG. 10, the ternary phase behavior of such a system is characterized by two sets of saturation curves at two different temperatures $T_c$ and $T_h$, with the solvent-free composition of the double saturation point at $T_c$ comprising more X compared to that at $T_h$. It should be noted that tie-lines and solid-only regions at each temperature are not drawn on the phase diagram to maintain clarity. In this exemplary embodiment, the composition of the crystallizer feed is adjusted from a composition corresponding to point 1 on FIG. 10 to a composition corresponding to point 2 by the removal of solvent, so that point 2 is located within the region where an X-rich solid solution can be crystallized out. It should also be noted that if the ternary phase behavior was different, the solvent adjustment may have to be accomplished by the addition of solvent for the composition of point 2 to arrive at the desirable region. Crystallization gives a solid solution with composition corresponding to point 6 on FIG. 10 and a mother liquor with composition corresponding to point 3. After separating the solids, the composition of the mother liquor is adjusted to a composition corresponding to point 4 by addition of solvent, so that point 4 is located within the region where Y solvate can be crystallized out. Note that if the ternary phase behavior was different, the solvent adjustment may have to be accomplished by the removal of solvent. Crystallization of Y solvate gives a mother liquor with a composition corresponding to point 5 in FIG. 10, which is mixed with recycle stream 9 in mixer 40 to form stream 14. This stream 14 is then mixed with fresh feed stream to provide stream 1.

Figure 11:
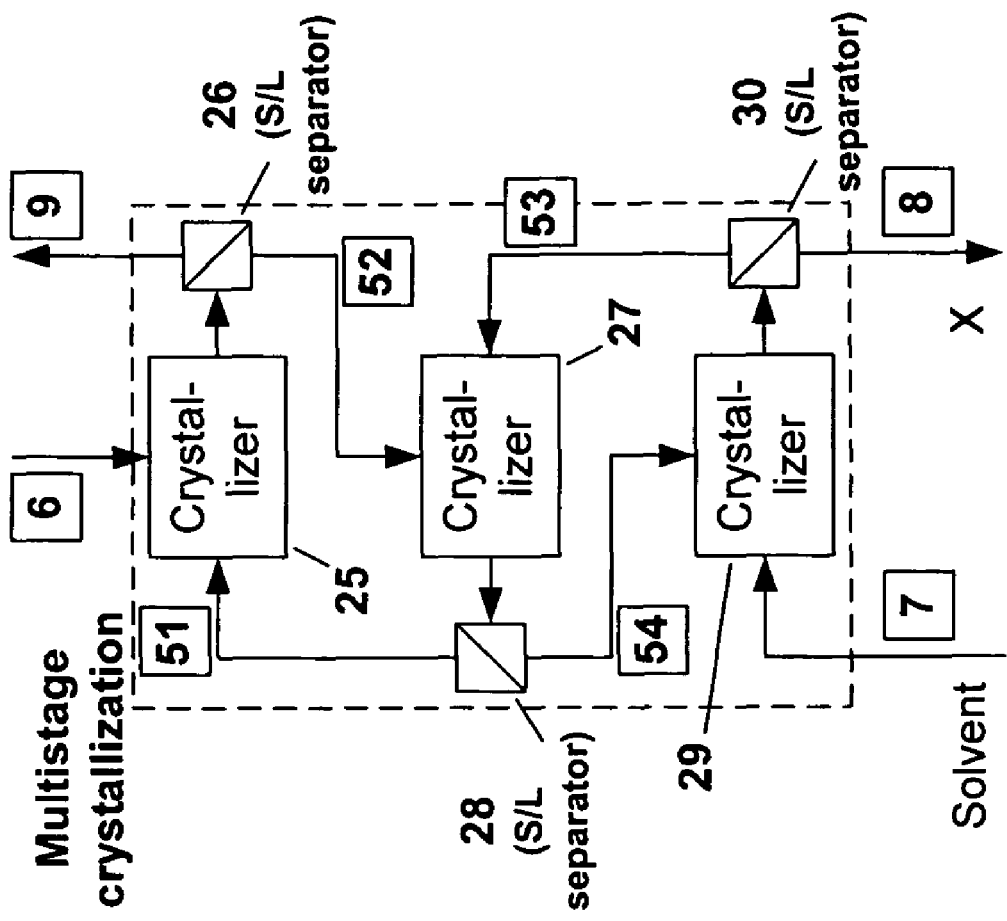
FIG. 11 is a schematic illustration showing the details of the multistage crystallization step that can be employed in the system described in FIG. 5 or FIG. 9.

In an even further embodiment, the present invention provides a process for simultaneously separating two highly pure fullerenes from a mixture of fullerenes that mainly contains the two fullerenes, wherein the phase behavior of the ternary system comprising the two fullerenes and a solvent is characterized by one or more regions where a solid solution can be crystallized out, such as those shown in FIG. 1(c), 1(d), and 1(f), in which the multistage crystallization step for purifying the solid solution comprises a series of crystallizers or a column crystallizer operated in a certain way that a highly pure solid fullerene can be obtained. In an exemplary embodiment shown in FIG. 11, the multistage crystallization step to obtain high-purity solid X from an X-rich solid solution comprises three crystallizers 25, 27, and 29, as well as three solid/liquid separators 26, 28, and 30. It should be understood that the actual number of crystallizers, which can be less or more than three, depends on the phase behavior of the ternary system and the target purity of the fullerene product. The entire train of crystallizers and solid/liquid separators may also be replaced by an appropriately designed column crystallizer that would provide an equivalent purification performance.

Figure 12:
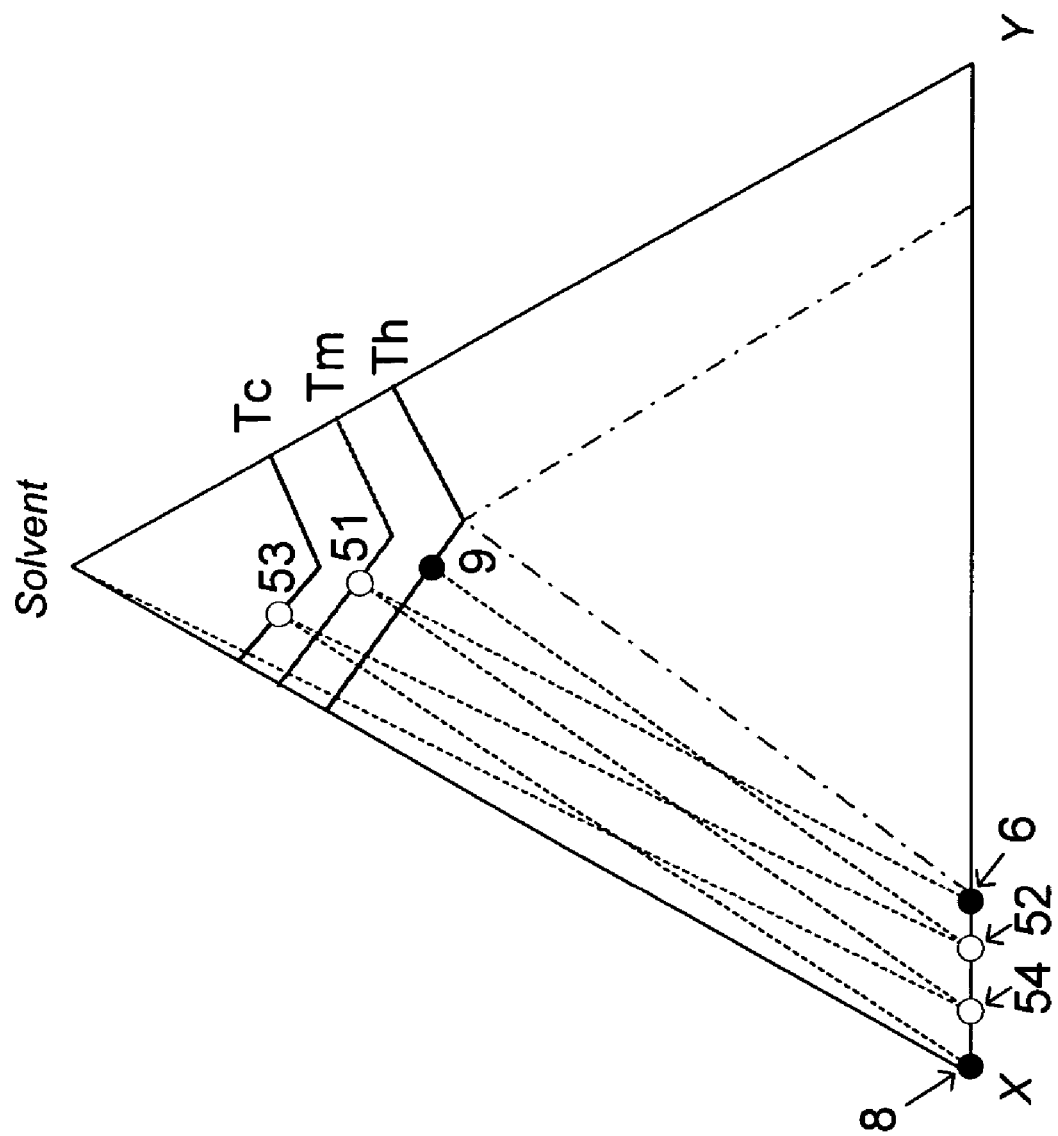
FIG. 12 is an isothermal phase equilibrium diagram for the ternary system of two fullerenes and a solvent, showing the composition of the process streams described in FIG. 11.

The process of this embodiment works as long as the orientation of the tie-lines is such that the solid phase contains more X than the solvent-free composition of the liquid phase. In an exemplary embodiment shown in FIG. 12, the ternary phase behavior of the system is characterized by three sets of saturation curves at three temperatures $T_c$, $T_m$, and $T_h$. It should be noted that tie-lines and solid-only regions at each temperature are not drawn on the phase diagram to maintain clarity. While it is generally advantageous to operate at different temperatures of $T_c$, $T_m$, and $T_h$, there should be no restriction that prevents these three temperatures of being the same. In this exemplary embodiment, an X-rich solid solution (stream 6) is mixed with stream 51 to form the feed to crystallizer 25, which operates at $T_h$. Crystallization provides a solid solution with a composition corresponding to point 52 in FIG. 12 and a mother liquor with a composition corresponding to point 9. After separation, the solid solution is mixed with stream 53 and fed to crystallizer 27, which operates at $T_m$. Crystallization provides a solid solution with composition corresponding to point 54 in FIG. 12 and a mother liquor with composition corresponding to point 51. After separation, the solid solution is then mixed with fresh solvent (stream 7) and fed to crystallizer 29, which operates at $T_c$. Crystallization provides a highly pure solid X with a composition corresponding to point 8 in FIG. 12 and a mother liquor with composition corresponding to point 53. The mother liquors 51 and 53 are recycled to the previous crystallization stage, thus creating a countercurrent scheme wherein the solid and liquid phases move in opposite directions.

In summary, it is shown that the present invention provides a powerful tool wherein the design and operating conditions of a process for simultaneously separating two highly pure fullerenes from a mixture of fullerenes that mainly contains the two components can be manipulated from selective control of the phase equilibrium diagram. An appropriate solvent can be selected to obtain a certain phase behavior of the ternary system comprising the two fullerenes and the solvent; and the amount of solvent and the crystallization temperature can be adjusted to bring the feed composition at the crystallizer to the desired region on the phase diagram.

The following example is for illustrative purposes and is not to be construed as limiting the present inventive subject matter.

EXAMPLE 1

Separation of Highly Pure $C_{60}$ and $C_{70}$ Solids from Mixed Fullerenes Via Crystallization Using o-xylene as the Solvent Since the isothermal solid-liquid equilibrium phase diagram of the system $C_{60}$-$C_{70}$-o-xylene at certain temperatures can be described by FIG. 1(d), i.e. with a region for the crystallization of $C_{60}$-rich solid solution, a region for the crystallization of $C_{70}$-rich solid solution and a region for the crystallization of both $C_{60}$-rich solid solution and $C_{70}$-rich solid solution, a crystallization process based on the flowsheet in FIG. 5 was carried out to separate $C_{60}$ and $C_{70}$ solids from a fullerene mixture that mainly contains such two species using o-xylene. 25 g of a fullerene mixture comprising 60 wt % $C_{60}$, 25 wt % $C_{70}$ and 15 wt % other higher fullerenes was stirred with 750 g of o-xylene at room temperature for about 1 day. After filtering out the undissolved solids, the resulting 600.12 g solution mixture was stirred at 110° C. for one day to undergo the first $C_{60}$ crystallization step. 5.39 g fullerene solids of 93.91 wt % $C_{60}$ and 6.09 wt % $C_{70}$ as well as a mother liquor with a mass of 564.08 g were obtained after filtration. At this point, the experiment proceeded in two different directions. In one direction, 5.04 g of the solids collected from the first $C_{60}$ crystallization step was stirred with 100.15 g of o-xylene at 110° C. for one day to undergo the second $C_{60}$ crystallization step. 4.01 g fullerene solids with 96.03 wt % $C_{60}$ and 3.97 wt % $C_{70}$ were collected from this step after filtration. 3.78 g of such solids were then subjected to the third $C_{60}$ crystallization step when they were stirred with 77.3 g of o-xylene at 110° C. for one day. 2.83 g fullerene solids with a composition of 96.84 wt % $C_{60}$ and 3.16 wt % $C_{70}$ were obtained after filtration. Next, 2.59 g of such solids were stirred with 50.1 g o-xylene at 110° C. for one day to undergo the fourth $C_{60}$ crystallization step. After filtration, 2.14 g fullerene solids with a $C_{60}$ content of 96.97 wt % and a $C_{70}$ content of 3.03 wt % resulted.

In the other direction, the 564.08 g mother liquor obtained from the first $C_{60}$ crystallization step was passed to a rotary evaporator to remove 241.71 g o-xylene by evaporation. The resulting solution was then stirred at −15° C. for two days to undergo the first $C_{70}$ crystallization step. 3.59 g solids containing 77.7 wt % $C_{70}$ and 22.3 wt % $C_{60}$ were collected following filtration. 3.25 g of such solids were further stirred with 59.45 g o-xylene at −15° C. for one day in the second $C_{70}$ crystallization step. From this step, 2.57 g fullerene solids comprising 83.11 wt % $C_{70}$ and 16.89 wt % $C_{60}$ were acquired by filtration. Next, 2.32 g of such solids were subjected to the third $C_{70}$ crystallization step and stirred with 44.75 g o-xylene at −15° C. for one day. After filtration, 1.56 g solids consisting of 94.99 wt % $C_{70}$ and 5.01 wt % $C_{60}$ were obtained. 1.41 g of such solids were subsequently stirred with 27.19 g o-xylene at −15° C. for one day in the fourth $C_{70}$ crystallization step to eventually produce 1.09 g fullerene solids composing 98.07 wt % $C_{70}$ and 1.93 wt % $C_{60}$.

The foregoing descriptions of specific embodiments of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It will be apparent that the same may be modified or varied in many ways. Such modifications and variations are not to be regarded as a departure from the spirit and scope of the present subject matter, and all such modifications and variations are intended to be included within the scope of the following claims.

I claim:

1. A method for separating two highly pure fullerenes, comprising:
   providing a mixture comprising a first fullerene component, a second fullerene component and a solvent, the mixture having a phase equilibrium behavior characterized by at least one region where pure fullerenes, solid solutions or solvates of the fullerenes can be crystallized out;
   simultaneously crystallizing the first fullerene component in a first crystallizer and the second fullerene component in a second crystallizer;
   obtaining two highly pure fullerenes.

2. The method of claim 1 further comprising purifying the solid solutions or the solvates into highly pure fullerenes when the crystals from the crystallizers are in the form of solid solution or solvate.

3. The method of claim 1 wherein a solvent is selected such that the phase diagram of a ternary mixture comprising the two fullerenes and a solvent is characterized by at least one region where pure fullerenes, solid solutions or solvates of the fullerenes can be crystallized out.

4. The method of claims 3 wherein the amount of a solvent and the temperature of the crystallizers are selectively controlled and adjusted to crystallize out the pure fullerenes, the solid solutions or the solvates of the fullerenes.

5. A method for simultaneously separating two highly pure fullerenes from a mixture of fullerenes, comprising:
   adjusting the amount of a solvent in the mixture fed to a first crystallizer to obtain a phase equilibrium behavior such that a first fullerene component of the two fullerenes, in the form of pure crystals, solid solution crystals, or solvate crystals, and a resultant liquid mixture obtained during crystallization; and
   adjusting the amount of the solvent in the resultant liquid mixture fed to a second crystallizer, operating at a different temperature compared to the first crystallizer, to obtain a phase equilibrium behavior such that a second fullerene component of the two fullerenes, in the form of pure crystals, solid solution crystals, or solvate crystals is obtained during crystallization,
   wherein the crystallization of the two fullerenes occurs simultaneously.

6. The method of claim 5 further comprising purifying the solid solutions or the solvates into highly pure fullerenes, when the solid product from the crystallizers is in the form of solid solution or solvate.

7. The method of claim 5 where the phase behavior of the ternary system comprising the two fullerenes and the solvent is characterized by regions where pure solid fullerenes can be crystallized out.

8. The method of claim 7 where the solvent-free composition of a double saturation point is changed with temperature.

9. The method of claim 5 where the phase behavior of the ternary system comprising the two fullerenes and the solvent is characterized by one or more regions where at least one solid solution can be crystallized out.

10. The method of claim 9 further comprising purifying the at least one solid solution using a multistage crystallization step comprising a series of crystallizers or a column crystallizer operated to obtain a highly pure solid fullerene.

11. The method of claim 9 wherein the phase behavior of the ternary system is characterized by only one solid solution region and shows crossing-over behavior.

12. The method of claim 9 wherein the phase behavior of the ternary system is characterized by two solid solution regions and the solvent-free composition of a double saturation point is changed with temperature.

13. The method of claims 5 wherein the phase behavior of a ternary system comprising two fullerenes and a solvent is characterized by at least one region where at least one solvate of at least one of the two fullerenes can be crystallized out.

14. The method of claim 13 further comprising purifying the at least one solvate using a solvent recovery step for removing solvent from the at least one solvates to obtain a highly pure fullerene final product.

15. The method of claim 13 wherein the solvent-free composition of a double saturation point is changed with temperature.

16. The method of claims 5 wherein the phase behavior of a ternary system comprising two fullerenes and a solvent is characterized by at least one region where a solid solution of the two fullerenes can be crystallized out and another region where at least one fullerene solvate can be crystallized out.

17. The method of claim 16 further comprising purifying the solvate to obtain a highly pure fullerene product by using a multistage crystallization step comprising a series of crystallizers or a column crystallizer operated to obtain the highly pure solid fullerene.

18. The method of claim 1 where the two fullerene components are selected from the group consisting of $C_{60}$, $C_{70}$, $C_{76}$, $C_{84}$, and other higher and lower molecular weight fullerenes represented by $C_{20+2m}$ where m is an integer.

19. The method of claim 18 wherein the two fullerene components are $C_{60}$ and $C_{70}$.

20. The method of claim 1 where the solvent is selected from the group consisting of 1,2-dimethylbenzene, 1,3-dimethylbenzene, 1,4-dimethylbenzene, toluene, 1,2,3-trimethylbenzene, 1,2,4-trimethylbenzene, 1,2,3,4-tetramethylbenzene, 1,2,3,5-tetramethylbenzene, 1,2,3,4-tetrahydronaphthalene, 1-methylnaphthalene, styrene, tetrachloromethane, 1,1,2,2-tetrachloroethane, chlorobenzene, 1,2-dichlorobenzene, 1,3-dichlorobenzene, 1,2,4-trichlorobenzene, bromobenzene tribromomethane, 1-chloronaphthalene, iodobenzene and pyrrolidine.

21. The method of claim 5 where the two fullerene components are selected from the group consisting of $C_{60}$, $C_{70}$, $C_{76}$, $C_{84}$, and other higher and lower molecular weight fullerenes represented by $C_{20+2m}$ where m is an integer.

22. The method of claim 5 where the solvent is selected from the group consisting of 1,2-dimethylbenzene, 1,3-dimethylbenzene, 1,4-dimethylbenzene, toluene, 1,2,3-trimethylbenzene, 1,2,4-trimethylbenzene, 1,2,3,4-tetramethylbenzene, 1,2,3,5-tetramethylbenzene, 1,2,3,4-tetrahydronaphthalene, 1-methylnaphthalene, styrene, tetrachloromethane, 1,1,2,2-tetrachloroethane, chlorobenzene, 1,2-dichlorobenzene, 1,3-dichlorobenzene, 1,2,4-trichlorobenzene, bromobenzene tribromomethane, 1-chloronaphthalene, iodobenzene and pyrrolidine.

* * * * *